(12) United States Patent
Salam et al.

(10) Patent No.: US 8,650,058 B1
(45) Date of Patent: Feb. 11, 2014

(54) SYSTEM AND METHOD FOR MANPOWER PLANNING FOR OPERATING VEHICLES SUCH AS AIRPLANES

(75) Inventors: Remi Salam, Irving, TX (US); Abhinav Sharma, Irving, TX (US)

(73) Assignee: American Airlines, Inc., Fort Worth, TX (US)

( * ) Notice: Subject to any disclaimer, the term of this patent is extended or adjusted under 35 U.S.C. 154(b) by 605 days.

(21) Appl. No.: 12/509,896

(22) Filed: Jul. 27, 2009

(51) Int. Cl.
*G06Q 10/00* (2012.01)

(52) U.S. Cl.
USPC ........ 705/7.12; 705/7.13; 705/7.16; 705/7.22

(58) Field of Classification Search
USPC ............ 705/2, 7.12, 7.13, 7.16, 7.24, 5, 7.14, 705/7.22; 701/120
See application file for complete search history.

(56) References Cited

U.S. PATENT DOCUMENTS

| | | | |
|---|---|---|---|
| 6,314,361 B1 * | 11/2001 | Yu et al. ........................ 701/120 |
| 6,578,005 B1 * | 6/2003 | Lesaint et al. ............... 705/7.14 |
| 2002/0143599 A1 * | 10/2002 | Nourbakhsh et al. ............ 705/9 |
| 2003/0105656 A1 * | 6/2003 | Thengvall et al. ................ 705/8 |
| 2003/0163334 A1 * | 8/2003 | Pachon et al. .................... 705/1 |
| 2004/0039628 A1 * | 2/2004 | Thompson et al. ............... 705/9 |
| 2004/0193473 A1 * | 9/2004 | Robertson et al. ............... 705/9 |
| 2005/0004828 A1 * | 1/2005 | deSilva et al. .................... 705/9 |
| 2006/0047554 A1 * | 3/2006 | Larsen et al. ..................... 705/8 |
| 2009/0089080 A1 * | 4/2009 | Meisel ............................. 705/2 |

FOREIGN PATENT DOCUMENTS

WO   WO 9642062 A1 * 12/1996

OTHER PUBLICATIONS

Yu, Gang; Pachon, Julian; Thengvall, Benjamin; Chandler, Darryal; Wilson, Al; Optimizing pilot planning and training for continental airlines; Jul. 1, 2004; http://business.highbeam.com/412142/article-1G1-122262916/optimizing-pilot-planning-and-trainingcontinental.*
Milind G. Sohoni, Ellis L. Johnson and T. Glenn Bailey; Long-Range Reserve Crew Manpower Planning; Jun. 2004; Management Science, vol. 50, No. 6 (Jun. 2004), pp. 724-739.*
Barnhart, Cynthia; Cohn, Amy. Airline Schedule Planning: Accomplishments and Opportunities. Manufacturing & Service Operations Management 6.1 (Winter 2004): 3-22.*

* cited by examiner

*Primary Examiner* — Lynda Jasmin
*Assistant Examiner* — Timothy Padot
(74) *Attorney, Agent, or Firm* — Haynes and Boone, LLP

(57) ABSTRACT

A system and method for manpower planning for operating vehicles such as, for example, airplanes, according to which, in several exemplary embodiments, the availability of adequate manpower to operate the vehicles over a period of time is ensured; in several exemplary embodiments, the operation of the vehicles over the period of time includes the flying of airplanes in accordance with an airline flight schedule.

11 Claims, 8 Drawing Sheets

| FLEET-SEAT COMBINATION 22 | NOV. 2008 | DEC. 2008 | JAN. 2009 |
|---|---|---|---|
| 777-CA | 6909 | 7334 | 17081 |
| 300-CA | 5258 | 5258 | 5499 |
| 767-CA | 58326 | 62249 | 64199 |
| 737-CA | 24037 | 25218 | 25324 |
| S80-CA | 77399 | 81585 | 81579 |
| | 171929 | 181885 | 193631 |
| 777-FO | 13776 | 14654 | 38066 |
| 300-FO | 5441 | 5716 | 5648 |
| 767-FO | 75036 | 80296 | 83071 |
| 737-FO | 24037 | 25218 | 25324 |
| S80-FO | 77399 | 81585 | 81579 |
| | 195689 | 207469 | 233688 |
| | 367618 | 389354 | 427319 |

*Fig. 5*

| FROM \ TO | 777CA | 300CA | 767CA | 737CA | S80CA | 777FO | 300FO | 767FO | 737FO | S80FO |
|---|---|---|---|---|---|---|---|---|---|---|
| 777CA | 0 | | | | | | | | | 0 |
| 300CA | | | | | | | | | | |
| 767CA | 0.8246 | | | | | | | | | 0 |
| 737CA | 0.0234 | | | | | | | | | 0 |
| S80CA | 0.1111 | | | | | | | | | 0.0313 |
| 777FO | 0.0409 | | | | | | | | | 0 |
| 300FO | | | | | | | | | | |
| 767FO | 0 | | | | | | | | | 0.4688 |
| 737FO | 0 | | | | | | | | | 0.5 |
| S80FO | 0 | | | | | | | | | 0 |

TO
(HISTORICAL MOVEMENT PERCENTAGE PAST CALENDAR YEAR)

*Fig. 6B*

| 777CA | Jul-09 | Aug-09 | Sep-09 | Oct-09 | Nov-09 | Dec-09 | Jan-10 | Feb-10 | Mar-10 | Apr-10 | May-10 | Jun-10 |
|---|---|---|---|---|---|---|---|---|---|---|---|---|
| Rev Hrs Sched (Calendar) | 19,084 | 19,360 | 18,585 | 19,109 | 18,024 | 18,863 | 18,864 | 17,058 | 18,871 | 19,104 | 19,262 | 18,660 |
| Rev Hrs Adj (+/-) | 82 | 353 | 180 | 271 | 370 | 643 | 604 | 589 | 631 | 600 | | |
| VC Man-Months | 20 | 19 | 21 | 24 | 33 | 43 | 29 | 38 | 33 | 23 | 17 | 17 |
| VC % | 6.54% | 6.29% | 6.96% | 8.19% | 11.03% | 14.30% | 9.69% | 12.77% | 11.13% | 7.81% | 5.75% | 5.75% |
| Pilots | 392 | 390 | 388 | 392 | 393 | 393 | 393 | 393 | 390 | 386 | 383 | 381 |
| Pilots in (Award To) | 2 | 3 | 3 | 4 | 5 | 6 | 5 | 4 | 3 | 3 | 2 | 3 |
| (From) 777-CA | | | | | | | | | | | | |
| (From) 300-CA | 0 | 0 | 0 | 0 | 0 | 0 | 0 | 0 | 0 | 0 | 0 | 0 |
| (From) 767-CA | 2 | 2 | 3 | 3 | 4 | 5 | 4 | 3 | 3 | 2 | 2 | 2 |
| (From) 737-CA | 0 | 0 | 0 | 0 | 0 | 0 | 0 | 0 | 0 | 0 | 0 | 0 |
| (From) S80-CA | 0 | 0 | 0 | 0 | 1 | 1 | 1 | 1 | 0 | 0 | 0 | 0 |
| (From) 777-FO | 0 | 0 | 0 | 0 | 0 | 0 | 0 | 0 | 0 | 0 | 0 | 0 |
| (From) 300-FO | 0 | 0 | 0 | 0 | 0 | 0 | 0 | 0 | 0 | 0 | 0 | 0 |
| (From) 767-FO | 0 | 0 | 0 | 0 | 0 | 0 | 0 | 0 | 0 | 0 | 0 | 0 |
| (From) 737-FO | 0 | 0 | 0 | 0 | 0 | 0 | 0 | 0 | 0 | 0 | 0 | 0 |
| (From) S80-FO | 0 | 0 | 0 | 0 | 0 | 0 | 0 | 0 | 0 | 0 | 0 | 0 |
| Pilots out (Forced out) | 0 | 0 | 0 | 0 | 0 | 0 | 0 | 0 | 0 | 0 | 0 | 0 |
| Total in | 4 | 4 | 7 | 9 | 7 | 6 | 5 | 4 | 3 | 3 | 2 | 3 |
| Total out | 0 | 0 | 0 | 0 | 0 | 0 | 0 | 0 | 0 | 0 | 0 | 0 |
| Regular Utilization | 78.34 | 78.34 | 78.42 | 78.42 | 78.42 | 78.42 | 78.42 | 78.42 | 78.42 | 78.42 | 78.42 | 78.42 |
| Reserve Utilization | 49.20 | 46.41 | 45.51 | 45.99 | 42.54 | 44.73 | 38.97 | 30.45 | 32.37 | 40.06 | 44.08 | 51.00 |

| S80FO | Jul-09 | Aug-09 | Sep-09 | Oct-09 | Nov-09 | Dec-09 | Jan-10 | Feb-10 | Mar-10 | Apr-10 | May-10 | Jun-10 |
|---|---|---|---|---|---|---|---|---|---|---|---|---|
| Ramp Hrs (Calendar) | 80,118 | 78,789 | 73,426 | 74,826 | 72,348 | 77,286 | 77,270 | 68,179 | 75,582 | 71,550 | 72,288 | 70,531 |
| Ramp Hrs (+/-) | 2,027 | 941 | 0 | 221 | 0 | 1,081 | 1,225 | 402 | 447 | 970 | 0 | 0 |
| VC Man-Months | 34 | 39 | 72 | 87 | 85 | 47 | 43 | 51 | 36 | 48 | 39 | 39 |
| VC % | 5.20% | 5.88% | 10.91% | 13.22% | 12.92% | 7.11% | 6.46% | 7.76% | 5.40% | 7.30% | 5.75% | 5.75% |
| Pilots | 1,372 | 1,364 | 1,308 | 1,303 | 1,341 | 1,331 | 1,323 | 1,317 | 1,310 | 1,304 | 1,290 | 1,277 |
| Pilots in (Award To) | 1 | 1 | 1 | 1 | 1 | 2 | 2 | 2 | 2 | 2 | 2 | 1 |
| (From) 777-CA | 0 | 0 | 0 | 0 | 0 | 0 | 0 | 0 | 0 | 0 | 0 | 0 |
| (From) 300-CA | 0 | 0 | 0 | 0 | 0 | 0 | 0 | 0 | 0 | 0 | 0 | 0 |
| (From) 767-CA | 0 | 0 | 0 | 0 | 0 | 0 | 0 | 0 | 0 | 0 | 0 | 0 |
| (From) 737-CA | 0 | 0 | 0 | 0 | 0 | 0 | 0 | 0 | 0 | 0 | 0 | 0 |
| (From) C00-CA | 0 | 0 | 0 | 0 | 0 | 0 | 0 | 0 | 0 | 0 | 0 | 0 |
| (From) 777-FO | 1 | 1 | 0 | 1 | 1 | 1 | 1 | 1 | 1 | 1 | 1 | 1 |
| (From) 300-FO | 0 | 0 | 0 | 0 | 0 | 0 | 0 | 0 | 0 | 0 | 0 | 0 |
| (From) 767-FO | 0 | 0 | 0 | 0 | 0 | 0 | 0 | 0 | 0 | 0 | 0 | 0 |
| (From) 737-FO | 0 | 0 | 0 | 0 | 0 | 0 | 0 | 0 | 0 | 0 | 0 | 0 |
| (From) S80-FO | 1 | 1 | 1 | 1 | 1 | 1 | 1 | 1 | 1 | 1 | 1 | 1 |
| Total in | 2 | 1 | 2 | 2 | 2 | 2 | 2 | 2 | 2 | 2 | 2 | 1 |
| Total out | 9 | 10 | 11 | 10 | 13 | 15 | 15 | 15 | 15 | 14 | 13 | 13 |
| Regular Utilization | 76.27 | 76.27 | 76.35 | 76.35 | 76.35 | 76.35 | 76.35 | 76.35 | 76.35 | 76.35 | 76.35 | 76.35 |
| Reserve Utilization | 66.87 | 66.42 | 66.06 | 65.65 | 62.84 | 67.85 | 62.42 | 64.80 | 62.88 | 65.49 | 67.15 | 77.74 |

| Recalls | Jul-09 | Aug-09 | Sep-09 | Oct-09 | Nov-09 | Dec-09 | Jan-10 | Feb-10 | Mar-10 | Apr-10 | May-10 | Jun-10 |
|---|---|---|---|---|---|---|---|---|---|---|---|---|
| 300FO | 8 | 3 | 0 | 1 | 6 | 3 | 1 | 0 | 0 | 3 | 0 | 0 |
| 767FO | 0 | 0 | 0 | 0 | 0 | 0 | 0 | 0 | 0 | 0 | 0 | 0 |
| 737FO | 0 | 10 | 4 | 7 | 16 | 3 | 11 | 14 | 17 | 13 | 6 | 8 |
| S80FO | 0 | 21 | 25 | 21 | 16 | 25 | 16 | 12 | 9 | 14 | 21 | 25 |
| Recalls Total | 0 | 4 | 6 | 7 | 2 | 6 | 7 | 9 | 10 | 8 | 0 | 2 |
| Recalls Limit | 0 | 35 | 35 | 35 | 35 | 35 | 35 | 35 | 35 | 35 | 27 | 35 |
| | 0 | 35 | 35 | 35 | 35 | 35 | 35 | 35 | 35 | 35 | 35 | 35 |

SYSTEM AND METHOD FOR MANPOWER PLANNING FOR OPERATING VEHICLES SUCH AS AIRPLANES

BACKGROUND

The present disclosure relates in general to manpower planning, and in particular to a system and method for manpower planning for operating vehicles over a period of time such as, for example, flying airplanes in accordance with a future airline flight schedule.

BRIEF DESCRIPTION OF THE DRAWINGS

FIG. 5 is a diagrammatic illustration of a spreadsheet used in a step of the method of FIG. 4, according to an exemplary embodiment.

FIG. 6B is a diagrammatic illustration of a spreadsheet used in a step of the step of FIG. 6A, according to an exemplary embodiment.

FIG. 10A is a diagrammatic illustration of a portion of output generated during the method of FIG. 4, according to an exemplary embodiment.

FIG. 10B is a diagrammatic illustration of another portion of output generated during the method of FIG. 4, according to an exemplary embodiment.

DETAILED DESCRIPTION

Figure 1:
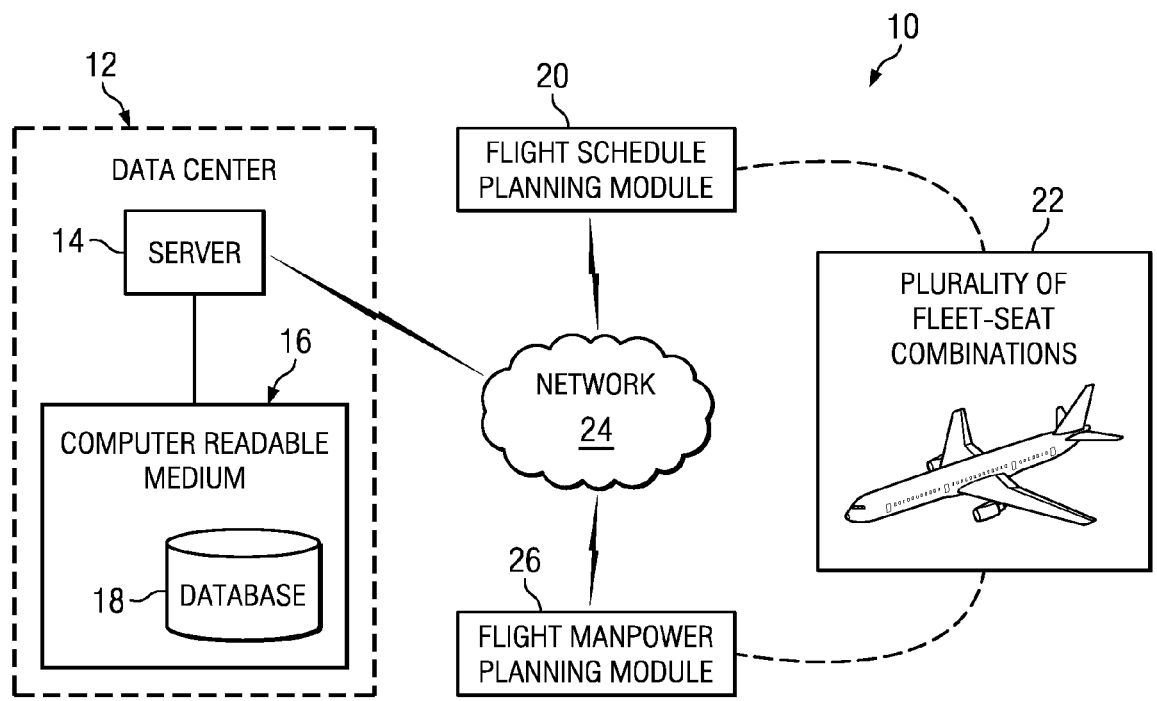
FIG. 1 is a diagrammatic illustration of a system according to an exemplary embodiment, the system including a plurality of fleet-seat combinations, a flight schedule planning module, and a flight manpower planning module.

In an exemplary embodiment, as illustrated in FIG. 1, a system is generally referred to by the reference numeral 10 and includes a data center 12 including a server 14 and a computer readable medium 16 operably coupled thereto. Instructions accessible to, and executable by, the server 14 are stored in the computer readable medium 16. A database 18 is also stored in the computer readable medium 16. The system 10 further includes a flight schedule planning module 20, which is used to generate a future airline flight schedule employing a plurality of fleet-seat combinations 22, in a manner to be described below. The flight schedule planning module 20 is operably coupled to, and in two-way communication with, the server 14 via a network 24. A flight manpower planning module 26 is operably coupled via the network 24 to each of the flight schedule planning module 20 and the server 14, and is used to ensure adequate cockpit manpower to fly the future airline flight schedule generated using the flight schedule planning module 20, in a manner to be described below.

In an exemplary embodiment, the server 14 is a web application server. In an exemplary embodiment, the data center 12 is, includes, or is at least a part of, a web-based program, an Intranet-based program, and/or any combination thereof. In an exemplary embodiment, the data center 12 and/or one or more components thereof, the computer readable medium 16 and/or content stored therein, the database 18 and/or content stored therein, and/or any combination thereof, are part of, and/or are distributed throughout, the system 10 and/or one or more of the components thereof, including, for example, one or more of the modules 20 and 26. In an exemplary embodiment, the network 24 includes the Internet, one or more local area networks, one or more wide area networks, one or more cellular networks, one or more wireless networks, one or more voice networks, one or more data networks, one or more communication systems, and/or any combination thereof. In several exemplary embodiments, the respective quantities of one or more of the components and/or parts of the system 10, such as, for example, the respective quantities of the data center 12, the server 14, the computer readable medium 16, the database 18, the module 20 and the module 26 are increased, decreased or otherwise varied.

Figure 2:
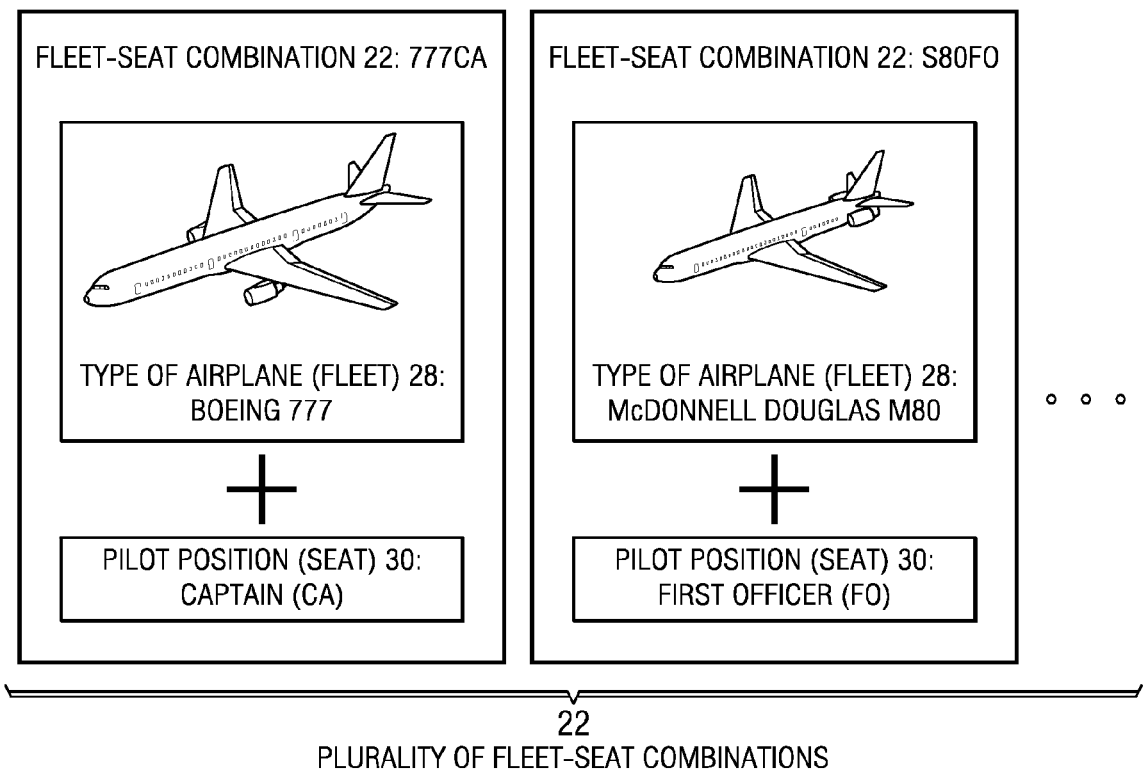
FIG. 2 is a diagrammatic illustration of the plurality of fleet-seat combinations of FIG. 1, according to an exemplary embodiment.

In an exemplary embodiment, as illustrated in FIG. 2 with continuing reference to FIG. 1, each fleet-seat combination 22 in the plurality of fleet-seat combinations 22 includes a type of airplane (or fleet) 28 and a cockpit or pilot position (or seat) 26. The fleet 28 includes the make and model of the airplane such as, for example and as shown in FIG. 2, a Boeing 777 airplane ("777") or a McDonnell Douglas M80 airplane ("S80"). The seat 26 can either be a captain ("CA") or a first officer ("FO"). Each fleet-seat combination 22 can be designated by the abbreviation of the model of the airplane type 28 and the abbreviation of the seat 26. For example and as shown in FIG. 2, one fleet-seat combination 22 is designated as "777CA", which indicates that the combination's airplane type 28 is a Boeing 777 airplane and the seat 26 is a captain, and another fleet-seat combination 22 is designated as "S80FO", which indicates that the combination's airplane type 28 is a McDonnell Douglas M80 airplane and the seat 26 is a first officer.

Figure 3:
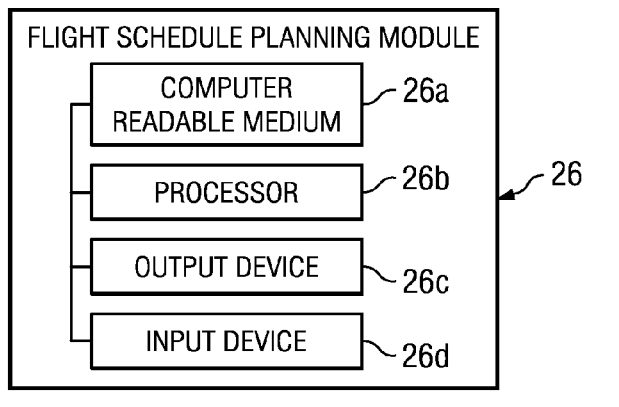
FIG. 3 is a diagrammatic illustration of the flight schedule planning module of FIG. 1, according to an exemplary embodiment.

In an exemplary embodiment, as illustrated in FIG. 3 with continuing reference to FIGS. 1 and 2, the flight manpower planning module 26 includes a computer readable medium 26a, a processor 26b, an output device 26c, and an input device 26d. In an exemplary embodiment, instructions accessible to, and executable by, the processor 26b are stored in the computer readable medium 26a. In an exemplary embodiment, spreadsheet and/or web browser software is stored in the computer readable medium 26a. In an exemplary embodiment, the output device 26c includes a graphical display, which, in several exemplary embodiments, is in the form of, or includes, one or more digital displays, one or more liquid crystal displays, one or more cathode ray tube monitors, and/or any combination thereof. In an exemplary embodiment, the output device 26c includes a graphical display, a printer, a plotter, and/or any combination thereof. In an exemplary embodiment, the input device 26d includes a touch screen, which, in several exemplary embodiments, is, includes, or is at least a part of, the output device 26c. In an exemplary embodiment, instead of, or in addition to a touch screen, the input device 26d includes one or more keyboards, one or more PIN pads, one or more scanners, one or more card readers, and/or any combination thereof.

In an exemplary embodiment, the module 26 is, includes, or is at least a part of, the data center 12, the server 14, the computer readable medium 16, the database 18, and/or any combination thereof. In several exemplary embodiments, the module 26 is a thin client and the server 14 controls at least a portion of the operation of the module 26. In several exemplary embodiments, the module 26 is a thick client. In several exemplary embodiments, the module 26 functions as both a thin client and a thick client. In several exemplary embodiments, the module 26 is, or includes, a telephone, a personal computer, a portable computer, a personal digital assistant, a cellular telephone, other types of telecommunications devices, other types of computing devices, and/or any combination thereof. In several exemplary embodiments, the module 26 includes a plurality of modules. In several exemplary embodiments, the module 26 is, or at least includes, the data center 12.

In an exemplary embodiment, the flight schedule planning module 20 is substantially identical to the flight manpower planning module 26 and therefore will not be described in detail. Reference numerals used to refer to the components of the module 20 that are substantially identical to the components of the module 26 will correspond to the reference numerals used to refer to the components of the module 26, except that the prefix for the reference numerals used to the describe the module 26, that is, 26, will be replaced by the prefix of the module 20, that is, 20. In several exemplary embodiments, one of the modules 20 and 26 is omitted in favor of the other of the modules 20 and 26. In several exemplary embodiments, the module 20 is combined in whole or in part with the module 26.

In several exemplary embodiments, the platforms of the server 14 and the modules 20 and 26 are identical, different, or vary with respect to equipment, peripherals, hardware architecture and/or specifications, software architecture and/or specifications, and/or any combination thereof.

Figure 4:
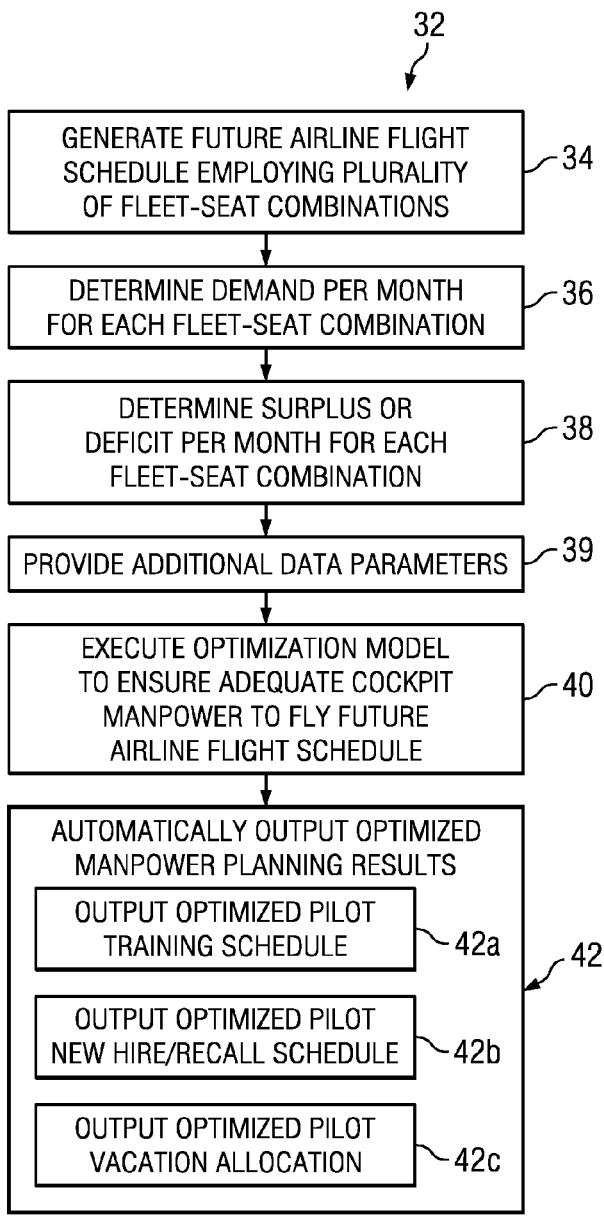
FIG. 4 is a flow chart illustration of a method of operating the system of FIG. 1, according to an exemplary embodiment.

In an exemplary embodiment, as illustrated in FIG. 4 with continuing reference to FIGS. 1-3, a method of operating the system 10 is generally referred to by the reference numeral 32 and, in several exemplary embodiments, the method 32 is implemented in whole or in part by the data center 12, the module 20, the module 26, and/or any combination thereof. As shown in FIG. 4, the method 32 includes generating a future airline flight schedule employing the plurality of fleet-seat combinations 22 in step 34, determining the demand per time segment, such as per month, of the flight schedule for each fleet-seat combination in step 36, determining the surplus or deficit per month of the flight schedule for each fleet-seat combination in step 38, providing additional data parameters in step 39, executing an optimization model to ensure adequate cockpit manpower to fly the flight schedule in step 40, and automatically outputting optimized manpower planning results in step 42, which includes outputting an optimized pilot training schedule in step 42a, outputting an optimized pilot new hire/recall schedule in step 42b, and outputting an optimized pilot vacation allocation schedule in step 42c.

In an exemplary embodiment, to generate the future airline flight schedule employing the plurality of fleet-seat combinations 22 in the step 34, the number of airline flights desired to be flown per a time segment (such as per month), per fleet 28 (777, S80, 767, etc.), per seat 30 (CA or FO) is specified over a time horizon or period such as, for example, a plurality of months, a year, or a plurality of years. In an exemplary embodiment, the time horizon is 9 months, 36 months, or a time period between 9 and 36 months. In several exemplary embodiments, the module 20 is used to specify the number of airline flights desired to be flown per month, per fleet 28, per seat 30.

In an exemplary embodiment, as illustrated in FIG. 5 with continuing reference to FIGS. 1-4, to determine the demand per month for each fleet-seat combination 22 in the step 36, the number of pilot-flying hours needed to fly airplanes in accordance with the future airline flight schedule generated in the step 34 is calculated. As shown in FIG. 5, this calculation is conducted and/or outputted in a spreadsheet 44, which includes a plurality of rows 46 and a plurality of rows 48, with the rows being grouped by seat 30 (CA or FO). More particularly, the plurality of rows 46 indicate the demand for fleet-seat combinations 22 having CA as the seat 30, and the plurality of rows 48 indicate the demand for fleet-seat combinations 22 having FO as the seat 30. Each of the rows 46 includes a plurality of cells 46a, each of which specifies the number of pilot-flying hours needed for a specific fleet-seat combination 22 (having CA as the seat 30) in a specific month of the time horizon of the airline flight schedule generated in the step 34. The plurality of rows 46 includes a row 46b specifying the total number of CAs needed per each month in the time horizon. Likewise, each of the rows 48 includes a plurality of cells 48a, each of which specifies the number of pilot-flying hours needed for a specific fleet-seat combination 22 (having FO as the seat 30) in a specific month of the time horizon of the airline flight schedule generated in the step 34. The plurality of rows 48 includes a row 48b specifying the total number of FOs needed per each month in the time horizon. The spreadsheet 44 also includes a row 50 of cells, each of which indicates the total number of pilot-flying hours needed in a specific month in the time horizon. In several exemplary embodiments, the data center 12, the module 20, the module 26, and/or any combination thereof, is used to generate, store, and/or output the spreadsheet 44 in the step 36.

In an exemplary embodiment, to determine the surplus or deficit per month for each fleet-seat combination 22 in the step 38, the mismatch or difference between the amount of hours that can be flown by the supply of pilots capable of flying the specific fleet-seat combination 22 and the demand for same as set forth in the cells 46a and 48a in the spreadsheet 44 is calculated, thereby determining the surplus or deficit of pilots. In an exemplary embodiment, the step 38 is automatically executed using a program stored in the data center 12, the module 20, the module 26, and/or any combination thereof, and/or is automatically executed in response to the execution of the optimization model in the step 40, which step will described in further detail below.

Figure 6A:
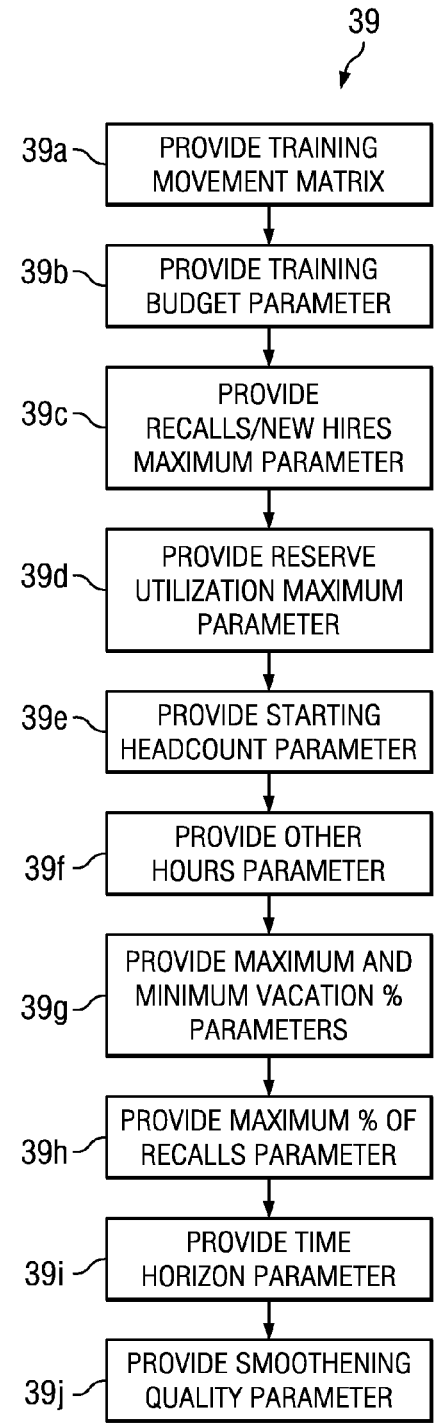
FIG. 6A is a flow chart illustration of a step of the method of FIG. 4, according to an exemplary embodiment.

In an exemplary embodiment, as illustrated in FIG. 6A with continuing reference to FIGS. 1-5, to provide additional data parameters in the step 39, a training movement matrix is provided in step 39a, a training budget parameter is provided in step 39b, a recalls/new hires maximum parameter is provided in step 39c, a reserve utilization maximum parameter is provided in step 39d, a starting head count parameter is provided in step 39e, an other hours parameter is provided in step 39f, minimum and maximum vacation percentage parameters are provided in step 39g, a maximum percentage recalls of total parameter is provided in step 39h, a time horizon parameter is provided in step 39i, and a smoothening quality parameter is provided in step 39j. The training movement matrix provided in the step 39a defines the bidding behavior of the pilots; for example, if 10 pilots are being awarded a specific fleet-seat combination 22, then the matrix defines how many pilots will come from other fleet-seat combinations 22. The training budget parameter provided in the step 39b provides the total number of pilots that can be training into a specific fleet-seat combination 22 (via both transitions and recalls/new hires) per month. The recalls/new hires maximum parameter provided in the step 39c provides the maximum number of recalls/new hires that the airline desires to have by month. The reserve utilization maximum parameter provides the maximum utilization that the reserve pilots should be made to work for a month by fleet-seat combination 22. The starting headcount parameter provided in the step 39e provides the number of pilots by fleet-seat combination available at the start of the time horizon. The other hours parameter provided in the step 39f provides the amount of other hours other than flying hours that need to be accounted for such as, for example, forecasted ground hold time. In several exemplary embodiments, one or more of the data parameters provided in the step 39 are stored in data files, spreadsheets, etc. in the data center 12, the module 20, the module 26, and/or any combination thereof, and/or one or more of the data parameters are inputted into a program immediately before executing the optimization model in the step 40 using the module 20 or 26.

In an exemplary embodiment, as illustrated in FIG. 6B with continuing reference to FIGS. 1-6A, to provide a training movement matrix in the step 39a, a spreadsheet 52 is generated using, and stored in, the data center 12, the module 20, the module 26, and/or any combination thereof. As shown in FIG. 6, the spreadsheet 52 includes a plurality of cells 52a, each of which indicates the percentage of pilots being trained for a specific fleet-seat combination 22 that are coming from a different fleet-seat combination 22. For example, as shown in the spreadsheet 52, 46.88% of the pilots being trained for the fleet-seat combination 22 of S80F0 come from the fleet-seat combination 22 of 767FO.

Figure 7:
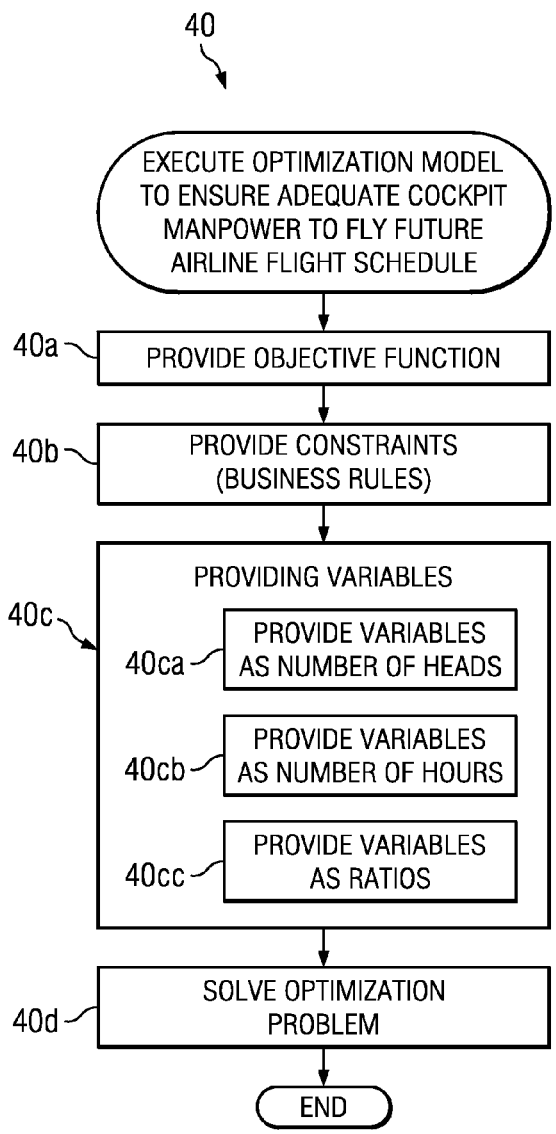
FIG. 7 is a flow chart illustration of another step of the method of FIG. 4, according to an exemplary embodiment.

In an exemplary embodiment, as illustrated in FIG. 7 with continuing reference to FIGS. 1-6B, to execute an optimization model to ensure adequate cockpit manpower in the step 40, an objective function is provided in step 40a, constraints (or business rules) are provided in step 40b, variables are provided in step 40c, which includes providing variables as number of heads in step 40ca, providing variables as hours in step 40cb and providing variables as hours in step 40cc, and the optimization model is solved in step 40d.

In an exemplary embodiment, providing the objective function in the step 40a includes providing a function having the objective of minimizing all slack. In an exemplary embodiment, providing the objective function in the step 40a includes providing the objective function as given by the following:
Minimize:

$$\text{Penal}^1 \sum_{t \in T} \sum_{i \in I} (\text{slack}_{i,t} * \text{slack}_{i,t}) + \text{Penal}^2 \sum_{j \in J} \sum_{i \in I} (\text{slack}_{i,j}^{train} * \text{slack}_{i,j}^{train}) + \text{Penal}^3 \sum_{i \in J} \sum_{j \in J} \sum_{t \in T} x_{i,j,t} + \text{Penal}^4 \sum_{t \in T} sickSlack_t$$

Figure 8:
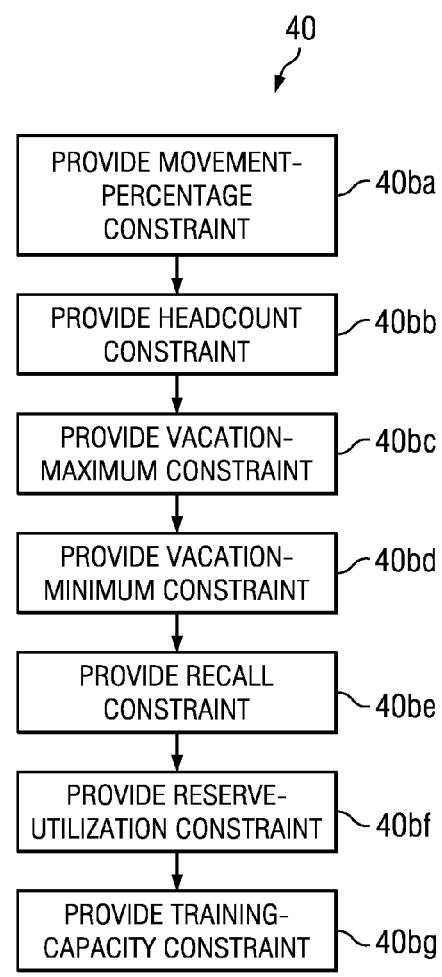
FIG. 8 is a flow chart illustration of a step of the step of FIG. 7, according to an exemplary embodiment.

In an exemplary embodiment, as illustrated in FIG. 8 with continuing reference to FIGS. 1-7, providing constraints (or business rules) in the step 40b includes providing a movement-percentage constraint in step 40ba, providing a headcount constraint in step 40bb, providing a vacation-maximum constraint in step 40bc, providing a vacation-minimum constraint in step 40bd, providing a recall constraint in step 40be, providing a reserve-utilization constraint in step 40bf, and providing a training-capacity constraint in step 40bg.

The movement-percentage constraint provided in the step 40ba requires that the total number of heads (or pilots) in transition training coming to a fleet-seat combination i over the time horizon of the future flight schedule must be equal to the sum of the total heads that the fleet-seat combination is supposed to gain by training in accordance with the training movement matrix and possible slack for the fleet-seat combination. The movement-percentage constraint provided in the step 40ba enforces the bidding behavior that the pilots have been historically following. For example, if 10 pilots are being awarded to the 777CA fleet-seat combination, the movement-percentage constraint provided in the step 40ba enforces how many pilots will come from the 767CA fleet-seat combination, the 737CA fleet-seat combination, the S80CA fleet-seat combination, etc. In an exemplary embodiment, the movement-percentage constraint provided in the step 40ba is given by the following expression:

$$\sum_{t \in T} x_{j,i,t} = \text{slack}_{i,j}^{train} + M_{i,j} * \sum_{t \in T} \sum_{k \in J_{from}^i} x_{k,i,t} \text{ For } \forall\, i,\, j \in J_{from}^j$$

The headcount restraint provided in the step 40bb requires that the headcount for month t and fleet-seat combination i is equal to the sum of the headcount for month t−1, the difference of heads coming from training and going to training, recalls, and other terms including attrition, retirement and offline. The headcount restraint provided in the step 40bb accounts for headcount change by each month for each fleet-seat combination 22. In an exemplary embodiment, the headcount restraint provided in the step 40bb is given by the following expression:

$$h_{i,t} = h_{i,t-1} + \sum_{j \in J} x_{j,i,t} + \sum_{j \in J} d_{j,i,t} - \sum_{k \in K^i} x_{i,k,t} - \sum_{k \in K} d_{i,k,t} + recalls_{i,t} + other_{i,t}$$

For ∀ i, t

The vacation-maximum constraint provided in the step 40bc requires that the maximum vacation for a month t and a fleet-seat combination i must be equal to or less than a predetermined maximum percentage of the total for the fleet-seat combination. In an exemplary embodiment, the vacation-maximum constraint provided in the step 40bc is given by the following expression:

$$V_i^*(\text{max·percentage}) \geq v_{i,t} \text{ For } \forall i \in J^{not\text{-}fixed}, t \in T$$

The vacation-minimum constraint provided in the step 40bd requires that the minimum vacation for a month t and a fleet-seat combination i must be equal to or more than a predetermined minimum percentage of the total for the fleet-seat combination. In an exemplary embodiment, the vacation-minimum constraint provided in the step 40bd is given by the following expression:

$$V_i^*(\text{min·percentage}) \leq v_{i,t} \text{ For } \forall i \in J^{not\text{-}fixed}, t \in T$$

The recall constraint provided in the step 40be requires that the sum of recalls for a month t over a fleet-seat combination i must equal the total recalls for the month. The recall constraint provided in the step 40be dictates the maximum amount of recalls of pilots (and new hires) per month. In an exemplary embodiment, the recall constraint provided in the step 40be is given by the following expression:

$$\sum_{i \in I^{Recall}} \text{recall}_{i,t} = K \text{ for } \forall t$$

The reserve-utilization constraint provided in the step 40bf requires that the reserve utilization for a fleet-seat combination i and a month t (which reserve utilization is calculated as the hours available after regular hours divided by the number of reserve heads or pilots available) with a slack must be equal to a target reserve utilization by fleet-seat combination and month. The reserve-utilization constraint provided in the step 40bf ensures that reserve utilization is equal to or below the target reserve utilization by fleet-seat combination and month. The reserve-utilization constraint provided in the step 40bf is a demand-supply constraint. In an exemplary embodiment, the reserve-utilization constraint provided in the step 40bg is given by the following expression:

$$\text{util}_{i,t}^{res\_tgt} * (h_{i,t} - \text{reg}_{i,t}) = \text{slack}_{i,t} + \text{hours}_{i,t} - \text{reg}_{i,t} * \text{util}_{i,t}^{reg}$$

For $\forall i, t$

The training-capacity restraint provided in the step 40bg requires that that the total number of heads (or pilots) going in training to a fleet f by month t is less than or equal to the total capacity for the fleet f and month t. The training-capacity restraint provided in the step 40bg ensures that the amount of pilots trained for each month by seat cannot exceed the total training budget available (via both transition and recalls/new hires) for each month by seat. In an exemplary embodiment, the training-capacity restraint provided in the step 40bg is given by the following expression:

$$\sum_{i \in I^f} \sum_{j \in J^i} x_{j,i,t} + \sum_{i \in I^f} \sum_{j \in J^f} d_{j,i,t} + \sum_{i \in I^f} \text{recalls}_{i,t} \leq CPT_{f,t}$$

For $\forall f \in I^f, t$

In an exemplary embodiment, the variables as number of heads provided in the step 40ca of the step 40c, one or more of which may be used in one or more of the constraints described above, are given by the following:

$x_{i,j,t}$—Number of training movements from seat/fleet i to j in month t. They go offline some time during t−1 for seat/feet i and is available for seat/fleet j during t $v_{i,t}$—Number of man-months allotted as vacation for seat/fleet i and month t $VF_{i,t}^{fixed}$—Fixed Vacation time for seat/fleet l and month t $d_{i,j,t}$—Number of displacements from i to j in month t. They go offline and online same as $x_{i,j,t}$.

$\text{recalls}_{i,t}$—Number of heads available via recalls to fly seat/fleet i and month t $h_{i,t}$—Number of heads available in month t for seat/fleet i (not all of these might be available to fly for the entire month t since some might be in training, etc).

$\text{reg}_{i,t}$—Number of regular heads available to fly seat/fleet i in month t $\text{lines}_{i,t}$—Number of actual lines needed to fly the schedule by seat/fleet i and month t K—Number of Recalls for each month $\text{other}_{i,t}$—Gain loss caused by attrition/offline by seat/fleet i and month t $CPT_{f,t}$—Training Capacity by Fleet f and month t $\text{slack}_{i,j}^{train}$—Slack for movement with regards to planned movement numbers from seat/fleet i to seat/fleet j In an exemplary embodiment, the variables as number of hours provided in the step 40cb of the step 40c, one or more of which may be used in one or more of the constraints described above, are given by the following:

$vh_{i,t}$—Number of hours allotted as vacation for seat/fleet i and month t $m_{i,t}$—Number of hours of training movement relief required in seat/fleet i and month t $\text{hours}_{i,t}$—Total required crew hours in seat/fleet i and month t $\text{input\_hours}_{i,t}$—Total required crew hours in seat/fleet i and month t excluding transition training hours and vacation allocation.

$\text{util}_{i,t}^{Re\ g}$—Regular utilization in hours for seat/fleet i and month t $\text{util}_{i,t}^{Re\ s}$—Reserve utilization in hours for seat/fleet i and month t $\text{util}_{i,t}^{Re\ s\_tgt}$—Target reserve utilization in hours for seat/fleet i and month t $\text{slack}_{i,t}$—Slack between target reserve utilization and actual reserve utilization by seat/fleet i and month t $\text{dis Relief}_{i,t}$—Displacement Relief by seat/fleet i and month t $\text{sup erTime}_{i,t}$—Supervisory time for flying by seat/fleet i and month t $\text{sick}_t^{T\arg et}$—Sick time target per pilot for month t $\text{sickSlack}_t$—Slack for sick target match In an exemplary embodiment, the variables as ratios provided in the step 40 cc of the step 40c, one or more of which may be used in one or more of the constraints described above, are given by the following:

$\text{factor}_i^{hours}$—Factor for compensating vacation and training in crew hours by seat/fleet i $\text{factor}_i^{train\ Relief}$—Training Relief factor by seat/fleet i $\text{sicktimeRate}_{i,t}$—Sick time rate by seat/fleet i and month t $\text{nisctimeRate}_{i,t}$—Miscellaneous time rate by seat/fleet i and month t $\text{cpatimeRate}_{i,t}$—CPA time rate by seat/fleet i and month t $\text{nonCredittimeRate}_{i,t}$—Non-credit time rate by seat/fleet i and month t $\text{perVactimeRate}_{i,t}$—Personal Vacation time rate by seat/fleet i and month t $\text{recallFactor}_{i,t}$—Recall factor by seat/fleet i and month t sup erTimeFactor—Supervisory Time Factor smoothFactor—Factor to smoothen training movements In an exemplary embodiment, to solve the optimization model in the step 40d of the step 40, the function provided in the step 40a is minimized with the constraints provided in the step 40b and the variables provided in the step 40c using the module 26; the function, constraints and variables are stored in whole or in part as instructions in the computer readable medium 26a, and the processor 26b executes the instructions to thereby solve the optimization model in the step 40b. In an exemplary embodiment, before and/or during the step 40, the processor 26b accesses one or more of the airline flight schedule generated in the step 34, the demand per month for each fleet-seat combination determined in the step 36, the surplus or deficit for each fleet-seat combination determined in the step 38, the additional data parameters provided in the step 39, and/or any combination thereof. In an exemplary embodiment, before and/or during the step 40, the processor 26b automatically executes one or more of the steps 36 and 38. In an exemplary embodiment, to solve the optimization model in the step 40d of the step 40, the function provided in the step 40a is solved with the constraints provided in the step 40b and the variables provided in the step 40c using the module 26; the function, constraints and variables are stored in whole or in part as instructions in the data center 12, the module 20, the module 26, and/or any combination thereof, and the instructions are executed by the server 14, the processor 20b, the processor 26b, and/or any combination thereof, to thereby solve the optimization model in the step 40b. In an exemplary embodiment, before and/or during the step 40, the server 14, the processor 20b, the processor 26b, and/or any combination thereof, accesses one or more of the airline flight schedule generated in the step 34, the demand per month for each fleet-seat combination determined in the step 36, the surplus or deficit for each fleet-seat combination determined in the step 38, the additional data parameters provided in the step 39, and/or any combination thereof. In an exemplary embodiment, before and/or during the step 40, the server 14, the processor 20b, the processor 26b, and/or any combination thereof, automatically executes one or more of the steps 36 and 38.

Figure 9:
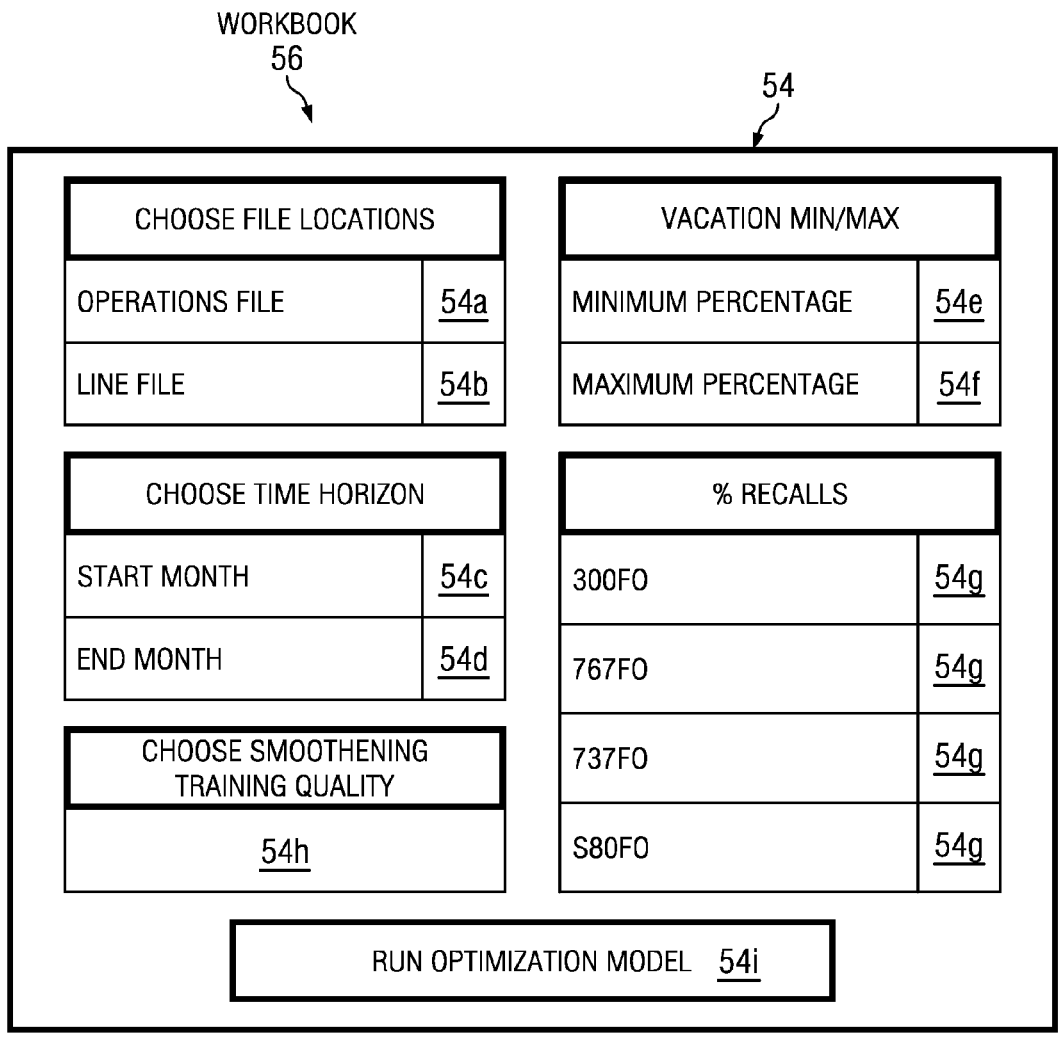
FIG. 9 is a diagrammatic illustration of an interface displayed during the execution of the method of FIG. 4, according to an exemplary embodiment.

In an exemplary embodiment, as illustrated in FIG. 9 with continuing reference to FIGS. 1-8, to execute at least the steps 39 and 40 of the method 32 and, in several exemplary embodiments, to further execute the steps 36 and 38, an interface 54 is provided in a workbook 56. The interface 54 is displayed on the output device 26c of the module 26, and includes fields 54a, 54b, 54c, 54d, 54e, 54f, a plurality of fields 54g, a field 54h, and a button 54i. The location of a file or files containing the demand per month for each of the fleet-seat combinations 22 (as determined in the step 38) is identified by clicking and/or otherwise selecting the field 54b and then either typing the name and path of the file or browsing for and selecting the file. In several exemplary embodiments, the file (or files) identified with the field 54b is a workbook including the spreadsheet 44 and, in some exemplary embodiments, a spreadsheet indicating the line utilization percentage per each fleet-seat combination 22 per month. The location of a file (or files) containing the additional data parameters provided in the steps 39a, 39b, 39c, 39d, 39e and 39f is identified by clicking and/or otherwise selecting the field 54a and then either typing the name and path of the file or browsing for and selecting the file. In an exemplary embodiment, the file identified with the field 54a is a spreadsheet or a workbook including spreadsheets. The time horizon parameter provided in the step 39i is provided by inputting a start month in the field 54c and inputting an end month in the field 54d. The time horizon parameter provided in the step 39i by inputting the start and end months in the fields 54c and 54d, respectively, is equal to or less than the time horizon used in the generation of the future airline flight schedule in the step 34. The maximum and minimum vacation percentage parameters provided in the step 39g are provided by inputting the maximum and minimum vacation percentages in the fields 54f and 54e, respectively. The maximum percentage of recalls parameter provided in the step 39h is provided by inputting the maximum percentage of recalls for each of the fleet-seat combinations 22 in the corresponding field 54g. The smoothening quality parameter provided in the step 39j is provided by inputting or selecting between High, Medium, Low or None for defining the smoothening of total training into a fleet-seat combination 22. The respective parameters are inputted into the fields 54c-54h with the input device 26d of the module 26, thereby executing the steps 39g-39j of the step 39 of the method 32. To solve the optimization model in the step 40d of the step 40 of the method 32, the button 54i is clicked and/or otherwise selected with the input device 26d and, in response, the processor 26b solves the optimization model in the step 40d with the function provided in the step 40a, the constraints provided in the step 40b and the variables provided in the step 40c, accessing the files identified in the fields 54a and 54b and instructions and data stored in the computer readable medium 26a, the computer readable medium 20a, the computer readable medium 16, the database 18, and/or any combination thereof. Alternatively, the optimization model is solved in the step 40d with the server 14, the processor 20b, the processor 26b, and/or any combination thereof.

In an exemplary embodiment, to automatically output optimized manpower planning results in the step 42 of the method 32, and as noted above, an optimized pilot training schedule is outputted in the step 42a, an optimized pilot new hire/recall schedule is outputted in the step which are automatically outputted in response to the execution of the optimization model in the step 40.

In an exemplary embodiment, as illustrated in FIGS. 10A and 10B with continuing reference to FIGS. 1-9, to automatically output optimized manpower planning results in the step 42, a table 58 is automatically pasted into one or more files such as one or more spreadsheets in response to the execution of the optimization model in the step 40. The table 58 is composed of a plurality of sub-tables 60, with each sub-table 60 corresponding to a fleet-seat combination 22, and a sub-table 62, which is located below the sub-tables 60. The file or files to which the table 58 is outputted may be stored in the computer readable medium 26a, the computer readable medium 20a, the computer readable medium 16, the database 18, and/or any combination thereof.

As shown in FIG. 10A, the sub-table 60 corresponding to the fleet-seat combination 22 of 777CA is illustrated, and includes a row including a plurality of cells 64, each of which indicates the optimized amount of vacation time such as, for example and as shown in FIG. 10A, the optimized number of vacation man-months, to be awarded to the fleet-seat combination 22 of 777CA for a specific month in the time horizon provided in the step 39i. For example, as shown in FIG. 10A, in July 2009, an optimum number of 20 man-months of vacation are to be awarded to the fleet-seat combination 22 of 777CA. As a result, vacation awards are optimally allocated to the fleet-seat combination of 777CA across the entire time horizon provided in the step 39i, with this optimal allocation being optimum with respect to the optimum vacation awards for the other fleet-seat combinations 22. The step 42c is thus executed by outputting the row including the plurality of cells 64 for each of the fleet-seat combinations 22. The sub-table 60 corresponding to the fleet-seat combination 22 of 777CA also includes a plurality of rows 66, each of which corresponds to a different fleet-seat combination 22 from which pilots will be trained and transferred to the fleet-seat combination 22 of 777CA. Each of the rows 66 includes a plurality of cells 68, each of which indicates, by month, the optimum number of pilots that will be awarded and thus trained to move from the fleet-seat combination 22 corresponding to the row to the fleet-seat combination 22 of 777CA. For example, as shown in FIG. 10A, in July 2009, an optimum number of two pilots are to be awarded and thus trained to move from the fleet-seat combination 22 of 767CA to the fleet-seat combination 22 of 777CA. As a result, an optimum number of pilots are to be trained so that the pilots can move to fleet-seat combinations 22 having pilot deficits, as determined in the step 38. The step 42a is thus executed by outputting the sub-table including the plurality of cells 64 for each of the fleet-seat combinations 22.

As shown in FIG. 10B, the sub-table 60 corresponding to the fleet-seat combination 22 of S80FO is illustrated, along with its corresponding cells 64, rows 66 and cells 68, and the sub-table 62 is illustrated. The sub-table 62 includes a plurality of rows 70, each of which corresponds to a different fleet-seat combination 22 for which pilots are to be recalled or hired. Each of the rows 70 includes a plurality of cells 72, each of which indicates, by month, the optimum number of recalls or new hires for the corresponding fleet-seat combination 22.

For example, in August 2009, an optimum number of 4 pilots are to be recalled or hired for the fleet-seat combination 22 of S80FO. The step 42*b* is thus executed by outputting the row including the plurality of cells 64 for each of the fleet-seat combinations 22.

By automatically outputting the table 58, the combination of (i) optimized vacation allocations per month for each of the fleet-seat combinations 22 employed by the airline flight schedule generated in the step 34 (the row 64 in each of the sub-tables 60), (ii) optimized transition training awards per month to each of the fleet-seat combinations 22 from all the other fleet-seat combinations 22 (the rows 66 in each of the sub-tables 60), and (iii) optimized number of recalls or new hires per month for each of the fleet-seat combinations 22 (the sub-table 62) is automatically outputted, thereby automatically outputting optimized manpower planning results in the step 42.

In an exemplary embodiment, during the step 42, in addition to, or instead of automatically outputting the table 58 to one or more files such as one or more spreadsheets, the table 58 or a portion thereof, or the output included in the table 58 or a portion of the data, is displayed in the interface 54 on the output device 26*c*, the output device 20*c*, and/or any combination thereof.

The optimized manpower planning results automatically outputted in the step 42 specify the optimized manner in which to address the surpluses and deficits determined in the step 38, namely by indicating how much vacation should be allocated among the different fleet-seat combinations 22 (as displayed in the row 64 in each of the sub-tables 60), indicating how many surplus pilots to train for a specific fleet-seat combination 22 with the surplus pilots coming from other fleet-seat combinations 22 (as displayed in the rows 66 in each of the sub-tables 60), and indicating how many pilots must be recalled or hired for each of the fleet-seat combinations 22 (as displayed in the sub-table 62); in several exemplary embodiments, each of these actions are controlled by business rules, which are reflected in one or more of the parameters provided in the step 39, the constraints provided in the step 40*b*, the variables provided in the step 40*c*, and/or any combination thereof.

In several exemplary embodiments, each of the steps 34, 36, 38, 39, 40 and 42 is executed before, during and/or after one or more of the other steps; in several exemplary embodiments, the steps 34, 36, 38, 39, 40 and 42 are executed simultaneously, sequentially, and/or any combination thereof.

In an exemplary embodiment, as a result of the operation of the system 10 by the execution of the method 32, the optimal way to address the surpluses and deficits determined in the step 38 for each fleet-seat combination 22 per month is provided. The pilot deficits determined in the step 38 are eliminated or at least minimized by drawing from the pilot surpluses determined in the step 38 and, if necessary, recalling pilots or hiring pilots. As a result, the availability of adequate cockpit manpower to fly the schedule generated in the step 34, or a portion of the schedule, is ensured.

In an exemplary embodiment, the operation of the system 10 by the execution of the method 32 results in the rapid enumeration and evaluation of billions of strategies for recalling and training pilots, and awarding vacation, and the selection of the most cost-effective strategy to ensure adequate manpower at a minimal cost.

In an exemplary embodiment, the operation of the system 10 by the execution of the method 32 results in a reduction of total training cost (simulator, instructor, check airmen cost), a reduction in the number or recalls resulting in payroll cost savings, and an increase in crew capability in that there is better CA/FO manning within each of the fleets 28 and also a reduction in training in peak months of flying.

In an exemplary embodiment, as a result, the operation of the system 10 by the execution of the method 32, crew capability in off-peak months is maximized by better matching CA and FO manning within each of the fleets 28, and the ability to prioritize the shift of this surplus to specific ones of the fleets 28.

In an exemplary embodiment, as a result of the operation of the system 10 by the execution of the method 32, the optimum manner to address the surpluses and deficits generated in the step 38 is determined in a short amount of time such as, for example, 45 seconds, which permits a quick turn-around to consider multiple scenarios. By providing optimized training allocations in the step 42*a*, the amount of training required is reduced, resulting in lower training cost and lower payroll cost, and the amount of recalls is reduced, also resulting in lower training cost and lower payroll cost. Moreover, as a result of the operation of the system 10 by the execution of the method 32, pilot productivity is increased. The operation of the system 10 by the execution of the method 32 provides "what-if" capability when analyzing different schedule scenarios, policies (business rules), etc.

In several exemplary embodiments, the operation of the system 10 by the execution of the method 32 permits the impact of increases or decreases to the pilot training budget to be estimated, and also permits the effect of various recruitment levels to be estimated. Moreover, the operation of the system 10 by the execution of the method 32 permits scenario analyses to be quickly and easily conducted, which analyses may be used to evaluate various schedule growth or reduction scenarios, and also permits policy analyses to be quickly and easily conducted, which analyses may be used to quantify the effect of current or future business rules.

In an exemplary experimental embodiment, the system 10 was operated by executing the method 32 in order to conduct a "what-if" study for which the experimental time horizon provided in the step 39*i* was the 2009 calendar year. If the experimental results were to be followed, that is, if cockpit manpower was planned for the year 2009 in accordance with the experimental optimized pilot training schedule outputted in the step 42*a*, the experimental optimized pilot new hire/recall schedule outputted in the step 42*b*, and the experimental optimized pilot vacation allocation outputted in the step 42*c*, then an experimental increase in pilot productivity of 0.3% (25 pilots) for the year was estimated. This experimental increase in pilot productivity would translate to increased revenue protection. Moreover, an experimental reduction of 25 training relieves in one of the expected peak periods of the time horizon (June 2009) was estimated.

In several exemplary embodiments, instead of, or in addition to ensuring the availability of adequate cockpit manpower to fly the schedule generated in the step 34 or a portion thereof, the operation of the system 10 by the execution of the method 32 is used to ensure the availability of adequate levels of other types of manpower such as, for example, adequate flight attendant manpower to fly the schedule generated in the step 34. In several exemplary embodiments, the Check Airman Scheduling is integrated into the optimization model executed in the step 40. In several exemplary embodiments, displacement optimization, i.e., recommending pilot displacements (forced training) in conjunction with regular training (voluntary training) is included in the optimization model executed in the step 40.

Figure 11:
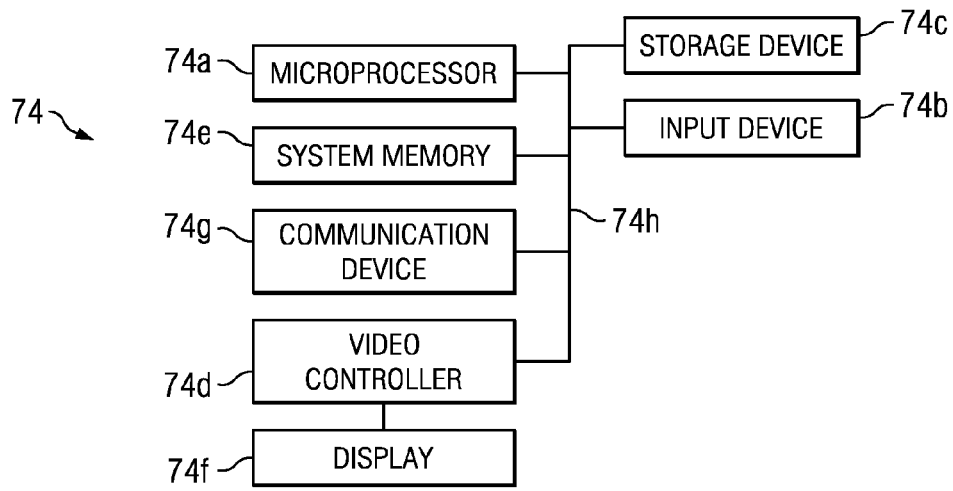
FIG. 11 is a diagrammatic illustration of a node for implementing one or more exemplary embodiments of the present disclosure, according to an exemplary embodiment.

In an exemplary embodiment, as illustrated in FIG. 11 with continuing reference to FIGS. 1-10B, an illustrative node 74 for implementing one or more embodiments of one or more of the above-described networks, elements, methods and/or steps, and/or any combination thereof, is depicted. The node 74 includes a microprocessor 74a, an input device 74b, a storage device 74c, a video controller 74d, a system memory 74e, a display 74f, and a communication device 74g all interconnected by one or more buses 74h. In several exemplary embodiments, the storage device 74c may include a floppy drive, hard drive, CD-ROM, optical drive, any other form of storage device and/or any combination thereof. In several exemplary embodiments, the storage device 74c may include, and/or be capable of receiving, a floppy disk, CD-ROM, DVD-ROM, or any other form of computer-readable medium that may contain executable instructions. In several exemplary embodiments, the communication device 74g may include a modem, network card, or any other device to enable the node to communicate with other nodes. In several exemplary embodiments, any node represents a plurality of interconnected (whether by intranet or Internet) computer systems, including without limitation, personal computers, mainframes, PDAs, and cell phones.

In several exemplary embodiments, one or more of the data center 12, the module 20 and the module 26 is, or at least includes, the node 74 and/or components thereof, and/or one or more nodes that are substantially similar to the node 74 and/or components thereof. In several exemplary embodiments, one or more of the above-described components of one or more of the node 74, the data center 12, the module 20, and the module 26, include respective pluralities of same components.

In several exemplary embodiments, a computer system typically includes at least hardware capable of executing machine readable instructions, as well as the software for executing acts (typically machine-readable instructions) that produce a desired result. In several exemplary embodiments, a computer system may include hybrids of hardware and software, as well as computer sub-systems.

In several exemplary embodiments, hardware generally includes at least processor-capable platforms, such as client-machines (also known as personal computers or servers), and hand-held processing devices (such as smart phones, personal digital assistants (PDAs), or personal computing devices (PCDs), for example). In several exemplary embodiments, hardware may include any physical device that is capable of storing machine-readable instructions, such as memory or other data storage devices. In several exemplary embodiments, other forms of hardware include hardware sub-systems, including transfer devices such as modems, modem cards, ports, and port cards, for example.

In several exemplary embodiments, software includes any machine code stored in any memory medium, such as RAM or ROM, and machine code stored on other devices (such as floppy disks, flash memory, or a CD ROM, for example). In several exemplary embodiments, software may include source or object code. In several exemplary embodiments, software encompasses any set of instructions capable of being executed on a node such as, for example, on a client machine or server.

In several exemplary embodiments, combinations of software and hardware could also be used for providing enhanced functionality and performance for certain embodiments of the present disclosure. In an exemplary embodiment, software functions may be directly manufactured into a silicon chip. Accordingly, it should be understood that combinations of hardware and software are also included within the definition of a computer system and are thus envisioned by the present disclosure as possible equivalent structures and equivalent methods.

In several exemplary embodiments, computer readable mediums include, for example, passive data storage, such as a random access memory (RAM) as well as semi-permanent data storage such as a compact disk read only memory (CD-ROM). One or more exemplary embodiments of the present disclosure may be embodied in the RAM of a computer to transform a standard computer into a new specific computing machine. In several exemplary embodiments, data structures are defined organizations of data that may enable an embodiment of the present disclosure. In an exemplary embodiment, a data structure may provide an organization of data, or an organization of executable code.

In several exemplary embodiments, the network 24, and/or one or more portions thereof, may be designed to work on any specific architecture. In an exemplary embodiment, one or more portions of the network 24 may be executed on a single computer, local area networks, client-server networks, wide area networks, internets, hand-held and other portable and wireless devices and networks.

In several exemplary embodiments, a database may be any standard or proprietary database software, such as Oracle, Microsoft Access, SyBase, or DBase II, for example. In several exemplary embodiments, the database may have fields, records, data, and other database elements that may be associated through database specific software. In several exemplary embodiments, data may be mapped. In several exemplary embodiments, mapping is the process of associating one data entry with another data entry. In an exemplary embodiment, the data contained in the location of a character file can be mapped to a field in a second table. In several exemplary embodiments, the physical location of the database is not limiting, and the database may be distributed. In an exemplary embodiment, the database may exist remotely from the server, and run on a separate platform. In an exemplary embodiment, the database may be accessible across the Internet. In several exemplary embodiments, more than one database may be implemented.

A system has been described that includes an airline flight schedule having a first time horizon including a plurality of time segments; a plurality of fleet-seat combinations associated with the airline flight schedule, each fleet-seat combination specifying a type of an airplane and a type of a resource associated with the operation of the airplane; and a node comprising a processor and a computer readable medium operably coupled thereto, the computer readable medium comprising a plurality of instructions stored therein, the plurality of instructions being accessible to, and executable by, the processor, the plurality of instructions comprising instructions for determining, for each fleet-seat combination, whether there is a surplus or deficit of the corresponding type of resource per each time segment; instructions for executing an optimization model to address the determined surpluses and deficits per each time segment over a second time horizon, the second time horizon being equal to or less than the first time horizon; and instructions for automatically outputting optimized manpower planning results in response to executing the optimization model, comprising instructions for, in response to the execution of the optimization model, automatically outputting a combination of: an optimized resource training schedule over the second time horizon; an optimized resource new hire/recall schedule over the second time horizon; and an optimized resource vacation allocation over the second time horizon. In an exemplary embodiment, each resource in each fleet-seat combination is a pilot and the type of the resource is either a captain or a first officer; wherein the system further comprises a plurality of airplane fleets for flying the airline flight schedule, each of the airplane fleets being associated with at least one of the fleet-seat combinations; a plurality of pilots who are captains; and a plurality of pilots who are first officers; wherein the plurality of instructions further comprises instructions for determining a plurality of demands per each time segment over the first time horizon, each demand being a demand for a different fleet-seat combination, wherein each surplus or deficit is dependent upon the demand per the corresponding time segment for the fleet-seat combination; instructions for generating the airline flight schedule; and instructions for providing data parameters, the data parameters comprising a training movement matrix; a training budget parameter; a recalls/new hires maximum parameter; a reserve utilization maximum parameter; a starting head count parameter; a minimum vacation percentage parameter; a maximum vacation percentage parameter; and a time horizon parameter corresponding to the second time horizon; wherein instructions for executing the optimization model comprise instructions for providing an objective function; instructions for providing a plurality of constraints, each of the constraints corresponding to one or more business rules, the plurality of constraints comprising a movement-percentage constraint; a headcount restraint; a vacation-maximum constraint; a vacation-minimum constraint; a recall constraint; a reserve-utilization constraint; and a training-capacity constraint; instructions for providing variables; and instructions for solving the optimization model with one or more of the data parameters, the objective function, the constraints, and the variables; wherein the optimized resource training schedule over the second time horizon comprises, for each fleet-seat combination per each time segment over the second time horizon, a plurality of first indicators, each first indicator indicating an optimized number of resources to be moved to the fleet-seat combination and identifying a different fleet-seat combination from which the resources are to be moved; wherein the optimized resource new hire/recall schedule over the second time horizon comprises, for each fleet-seat combination per each time segment over the second time horizon, a plurality of second indicators, each second indicator indicating an optimized number of resources to be recalled and/or hired for the fleet-seat combination; and wherein the optimized resource vacation allocation over the second time horizon comprises, for each fleet-seat combination per each time segment over the second time horizon, a plurality of third indicators, each third indicator indicating an optimized amount of vacation time to be awarded to the fleet-seat combination.

A method has been described that includes providing an airline flight schedule having a first time horizon including a plurality of time segments; providing a plurality of fleet-seat combinations associated with the airline flight schedule, each fleet-seat combination specifying a type of an airplane and a type of a resource associated with the operation of the airplane; determining, for each fleet-seat combination, whether there is a surplus or deficit of the corresponding type of resource per each time segment; executing an optimization model to address the determined surpluses and deficits per each time segment over a second time horizon, the second time horizon being equal to or less than the first time horizon; and automatically outputting optimized manpower planning results in response to executing the optimization model, comprising in response to the execution of the optimization model, automatically outputting a combination of: an optimized resource training schedule over the second time horizon; an optimized resource new hire/recall schedule over the second time horizon; and an optimized resource vacation allocation over the second time horizon. In an exemplary embodiment, each resource in each fleet-seat combination is a pilot and the type of the resource is either a captain or a first officer; wherein the method further comprises determining a plurality of demands per each time segment over the first time horizon, each demand being a demand for a different fleet-seat combination, wherein each surplus or deficit is dependent upon the demand per the corresponding time segment for the fleet-seat combination; generating the airline flight schedule; and providing data parameters, the data parameters comprising a training movement matrix; a training budget parameter; a recalls/new hires maximum parameter; a reserve utilization maximum parameter; a starting head count parameter; a minimum vacation percentage parameter; a maximum vacation percentage parameter; and a time horizon parameter corresponding to the second time horizon; wherein executing the optimization model comprises providing an objective function; providing a plurality of constraints, each of the constraints corresponding to one or more business rules, the plurality of constraints comprising a movement-percentage constraint; a headcount restraint; a vacation-maximum constraint; a vacation-minimum constraint; a recall constraint; a reserve-utilization constraint; and a training-capacity constraint; providing variables; and solving the optimization model with one or more of the data parameters, the objective function, the constraints, and the variables; wherein the optimized resource training schedule over the second time horizon comprises, for each fleet-seat combination per each time segment over the second time horizon, a plurality of first indicators, each first indicator indicating an optimized number of resources to be moved to the fleet-seat combination and identifying a different fleet-seat combination from which the resources are to be moved; wherein the optimized resource new hire/recall schedule over the second time horizon comprises, for each fleet-seat combination per each time segment over the second time horizon, a plurality of second indicators, each second indicator indicating an optimized number of resources to be recalled and/or hired for the fleet-seat combination; and wherein the optimized resource vacation allocation over the second time horizon comprises, for each fleet-seat combination per each time segment over the second time horizon, a plurality of third indicators, each third indicator indicating an optimized amount of vacation time to be awarded to the fleet-seat combination.

A system has been described that includes an airline flight schedule having a first time horizon including a plurality of time segments; a plurality of fleet-seat combinations associated with the airline flight schedule, each fleet-seat combination specifying a type of an airplane and a type of a resource associated with the operation of the airplane; and means for determining, for each fleet-seat combination, whether there is a surplus or deficit of the corresponding type of resource per each time segment; means for executing an optimization model to address the determined surpluses and deficits per each time segment over a second time horizon, the second time horizon being equal to or less than the first time horizon; and means for automatically outputting optimized manpower planning results in response to executing the optimization model, comprising means for, in response to the execution of the optimization model, automatically outputting a combination of: an optimized resource training schedule over the second time horizon; an optimized resource new hire/recall schedule over the second time horizon; and an optimized resource vacation allocation over the second time horizon. In an exemplary embodiment, each resource in each fleet-seat combination is a pilot and the type of the resource is either a captain or a first officer; wherein the system further comprises a plurality of airplane fleets for flying the airline flight schedule, each of the airplane fleets being associated with at least one of the fleet-seat combinations; a plurality of pilots who are captains; and a plurality of pilots who are first officers; wherein the system further comprises means for determining a plurality of demands per each time segment over the first time horizon, each demand being a demand for a different fleet-seat combination, wherein each surplus or deficit is dependent upon the demand per the corresponding time segment for the fleet-seat combination; means for generating the airline flight schedule; and means for providing data parameters, the data parameters comprising a training movement matrix; a training budget parameter; a recalls/new hires maximum parameter; a reserve utilization maximum parameter; a starting head count parameter; a minimum vacation percentage parameter; a maximum vacation percentage parameter; and a time horizon parameter corresponding to the second time horizon; wherein means for executing the optimization model comprise means for providing an objective function; means for providing a plurality of constraints, each of the constraints corresponding to one or more business rules, the plurality of constraints comprising a movement-percentage constraint; a headcount restraint; a vacation-maximum constraint; a vacation-minimum constraint; a recall constraint; a reserve-utilization constraint; and a training-capacity constraint; means for providing variables; and means for solving the optimization model with one or more of the data parameters, the objective function, the constraints, and the variables; wherein the optimized resource training schedule over the second time horizon comprises, for each fleet-seat combination per each time segment over the second time horizon, a plurality of first indicators, each first indicator indicating an optimized number of resources to be moved to the fleet-seat combination and identifying a different fleet-seat combination from which the resources are to be moved; wherein the optimized resource new hire/recall schedule over the second time horizon comprises, for each fleet-seat combination per each time segment over the second time horizon, a plurality of second indicators, each second indicator indicating an optimized number of resources to be recalled and/or hired for the fleet-seat combination; and wherein the optimized resource vacation allocation over the second time horizon comprises, for each fleet-seat combination per each time segment over the second time horizon, a plurality of third indicators, each third indicator indicating an optimized amount of vacation time to be awarded to the fleet-seat combination.

It is understood that variations may be made in the foregoing without departing from the scope of the disclosure. For example, instead of, or in addition to manpower planning for the operation of airplanes or other operations often conducted in the course of airline industry business, aspects of the present disclosure are applicable and/or readily adaptable to operations conducted in other industries such as, for example, rail, bus, cruise and other travel industries, shipping or delivery industries, rental car industries, hotels and other hospitality industries, entertainment industries, and other industries. In several exemplary embodiments, aspects of the present disclosure are readily applicable and/or readily adaptable to manpower planning for operating ships, trucks, trains, cars, other types of vehicles, and/or any combination thereof. In several exemplary embodiments, aspects of the present disclosure are readily applicable and/or readily adaptable to manpower planning for operating machinery, manpower planning for assembly operations, manpower planning for manufacturing operations, and/or any combination thereof.

In several exemplary embodiments, the elements and teachings of the various illustrative exemplary embodiments may be combined in whole or in part in some or all of the illustrative exemplary embodiments. In addition, one or more of the elements and teachings of the various illustrative exemplary embodiments may be omitted, at least in part, and/or combined, at least in part, with one or more of the other elements and teachings of the various illustrative embodiments.

Any spatial references such as, for example, "upper," "lower," "above," "below," "between," "bottom," "vertical," "horizontal," "angular," "upwards," "downwards," "side-to-side," "left-to-right," "right-to-left," "top-to-bottom," "bottom-to-top," "top," "bottom," "bottom-up," "top-down," etc., are for the purpose of illustration only and do not limit the specific orientation or location of the structure described above.

In several exemplary embodiments, while different steps, processes, and procedures are described as appearing as distinct acts, one or more of the steps, one or more of the processes, and/or one or more of the procedures may also be performed in different orders, simultaneously and/or sequentially. In several exemplary embodiments, the steps, processes and/or procedures may be merged into one or more steps, processes and/or procedures.

In several exemplary embodiments, one or more of the operational steps in each embodiment may be omitted. Moreover, in some instances, some features of the present disclosure may be employed without a corresponding use of the other features. Moreover, one or more of the above-described embodiments and/or variations may be combined in whole or in part with any one or more of the other above-described embodiments and/or variations.

Although several exemplary embodiments have been described in detail above, the embodiments described are exemplary only and are not limiting, and those skilled in the art will readily appreciate that many other modifications, changes and/or substitutions are possible in the exemplary embodiments without materially departing from the novel teachings and advantages of the present disclosure. Accordingly, all such modifications, changes and/or substitutions are intended to be included within the scope of this disclosure as defined in the following claims. In the claims, means-plus-function clauses are intended to cover the structures described herein as performing the recited function and not only structural equivalents, but also equivalent structures.

What is claimed is:

1. A system comprising:
   an airline flight schedule having a first time horizon including a plurality of time segments;
   a plurality of fleet-seat combinations associated with the airline flight schedule, each fleet-seat combination specifying a type of an airplane and a type of a resource associated with the operation of the airplane; and
   a node comprising a processor and a non-transitory computer readable medium operably coupled thereto, the computer readable medium comprising a plurality of instructions stored therein, the plurality of instructions being accessible to, and executable by, the processor, the plurality of instructions comprising:
      instructions for determining, for each fleet-seat combination, surplus or deficit of the corresponding type of resource per each time segment;
      instructions for executing an optimization model to address the determined surpluses and deficits per each time segment over a second time horizon, the second time horizon being equal to or less than the first time horizon;
         wherein execution of the optimization model generates a combination, the combination comprising an optimized resource training schedule over the second time horizon, an optimized resource new hire/recall schedule over the second time horizon, and an optimized resource vacation allocation over the second time horizon;

wherein the optimized resource training schedule over the second time horizon comprises, for each fleet-seat combination per each time segment over the second time horizon, a plurality of first indicators, each first indicator indicating an optimized number of resources to be moved to the fleet-seat combination and identifying a different fleet-seat combination from which the resources are to be moved;

wherein the optimized resource new hire/recall schedule over the second time horizon comprises, for each fleet-seat combination per each time segment over the second time horizon, a plurality of second indicators, each second indicator indicating an optimized number of resources to be recalled and/or hired for the fleet-seat combination;

wherein the optimized resource vacation allocation over the second time horizon comprises, for each fleet-seat combination per each time segment over the second time horizon, a plurality of third indicators, each third indicator indicating an optimized amount of vacation time to be awarded to the fleet-seat combination;

wherein the generation of each of the optimized resource training schedule, the optimized resource new hire/recall schedule, and the optimized resource vacation allocation is simultaneously dependent upon the generation of the other two of the optimized resource training schedule, the optimized resource new hire/recall schedule, and the optimized resource vacation allocation; and wherein the execution of the optimization model and thus the combination simultaneously at least:
minimizes the deficits per each time segment over the second time horizon;
minimizes, for each fleet-seat combination per each time segment over the second time horizon, the number of resources to be moved to the fleet-seat combination;
minimizes, for each fleet-seat combination per each time segment over the second time horizon, the number of resources to be recalled and/or hired for the fleet-seat combination; and
ensures that each of the optimized resource training schedule, the optimized resource new hire/recall schedule, and the optimized resource vacation allocation complies with at least one business rule;

instructions for automatically outputting optimized manpower planning results in response to executing the optimization model, comprising:
instructions for, in response to the execution of the optimization model, automatically outputting the optimized resource training schedule, the optimized resource new hire/recall schedule and the optimized resource vacation allocation.

2. The system of claim 1 wherein each resource in each fleet-seat combination is a pilot and the type of the resource is either a captain or a first officer; and
wherein the system further comprises:
a plurality of airplane fleets for flying the airline flight schedule, each of the airplane fleets being associated with at least one of the fleet-seat combinations;
a plurality of pilots who are captains; and
a plurality of pilots who are first officers.

3. The system of claim 1 wherein the plurality of instructions further comprises:
instructions for determining a plurality of demands per each time segment over the first time horizon, each demand being a demand for a different fleet-seat combination;
wherein each surplus or deficit is dependent upon the demand per the corresponding time segment for the fleet-seat combination.

4. The system of claim 1 wherein the plurality of instructions further comprises:
instructions for generating the airline flight schedule.

5. The system of claim 1 wherein the plurality of instructions further comprises:
instructions for providing data parameters, the data parameters comprising:
a training movement matrix;
a training budget parameter;
a recalls/new hires maximum parameter;
a reserve utilization maximum parameter;
a starting head count parameter;
a minimum vacation percentage parameter;
a maximum vacation percentage parameter; and
a time horizon parameter corresponding to the second time horizon;
wherein instructions for executing the optimization model comprise:
instructions for providing an objective function;
instructions for providing a plurality of constraints, each of the constraints corresponding to one or more business rules, the plurality of constraints comprising:
a movement-percentage constraint;
a headcount restraint;
a vacation-maximum constraint;
a vacation-minimum constraint;
a recall constraint;
a reserve-utilization constraint; and
a training-capacity constraint;
instructions for providing variables; and
instructions for solving the optimization model with one or more of the data parameters, the objective function, the constraints, and the variables.

6. The system of claim 1 wherein each resource in each fleet-seat combination is a pilot and the type of the resource is either a captain or a first officer;
wherein the system further comprises:
a plurality of airplane fleets for flying the airline flight schedule, each of the airplane fleets being associated with at least one of the fleet-seat combinations;
a plurality of pilots who are captains; and
a plurality of pilots who are first officers;
wherein the plurality of instructions further comprises:
instructions for determining a plurality of demands per each time segment over the first time horizon, each demand being a demand for a different fleet-seat combination, wherein each surplus or deficit is dependent upon the demand per the corresponding time segment for the fleet-seat combination;
instructions for generating the airline flight schedule; and
instructions for providing data parameters, the data parameters comprising:
a training movement matrix;
a training budget parameter;
a recalls/new hires maximum parameter;

a reserve utilization maximum parameter;
a starting head count parameter;
a minimum vacation percentage parameter;
a maximum vacation percentage parameter; and
a time horizon parameter corresponding to the second time horizon;
wherein instructions for executing the optimization model comprise:
instructions for providing an objective function;
instructions for providing a plurality of constraints, each of the constraints corresponding to one or more business rules, the plurality of constraints comprising:
a movement-percentage constraint;
a headcount restraint;
a vacation-maximum constraint;
a vacation-minimum constraint;
a recall constraint;
a reserve-utilization constraint; and
a training-capacity constraint;
instructions for providing variables; and
instructions for solving the optimization model with one or more of the data parameters, the objective function, the constraints, and the variables.

7. A method comprising:
providing an airline flight schedule having a first time horizon including a plurality of time segments;
providing a plurality of fleet-seat combinations associated with the airline flight schedule, each fleet-seat combination specifying a type of an airplane and a type of a resource associated with the operation of the airplane; and
determining, using a computer system, for each fleet-seat combination, a surplus or deficit of the corresponding type of resource per each time segment;
executing, using the computer system, an optimization model to address the determined surpluses and deficits per each time segment over a second time horizon, the second time horizon being equal to or less than the first time horizon;
wherein execution of the optimization model generates a combination, the combination comprising an optimized resource training schedule over the second time horizon, an optimized resource new hire/recall schedule over the second time horizon, and an optimized resource vacation allocation over the second time horizon;
wherein the optimized resource training schedule over the second time horizon comprises, for each fleet-seat combination per each time segment over the second time horizon, a plurality of first indicators, each first indicator indicating an optimized number of resources to be moved to the fleet-seat combination and identifying a different fleet-seat combination from which the resources are to be moved;
wherein the optimized resource new hire/recall schedule over the second time horizon comprises, for each fleet-seat combination per each time segment over the second time horizon, a plurality of second indicators, each second indicator indicating an optimized number of resources to be recalled and/or hired for the fleet-seat combination;
wherein the optimized resource vacation allocation over the second time horizon comprises, for each fleet-seat combination per each time segment over the second time horizon, a plurality of third indicators, each third indicator indicating an optimized amount of vacation time to be awarded to the fleet-seat combination;
wherein the generation of each of the optimized resource training schedule, the optimized resource new hire/recall schedule, and the optimized resource vacation allocation is simultaneously dependent upon the generation of the other two of the optimized resource training schedule, the optimized resource new hire/recall schedule, and the optimized resource vacation allocation; and
wherein the execution of the optimization model and thus the combination simultaneously at least:
minimizes the deficits per each time segment over the second time horizon;
minimizes, for each fleet-seat combination per each time segment over the second time horizon, the number of resources to be moved to the fleet-seat combination;
minimizes, for each fleet-seat combination per each time segment over the second time horizon, the number of resources to be recalled and/or hired for the fleet-seat combination; and
ensures that each of the optimized resource training schedule, the optimized resource new hire/recall schedule, and the optimized resource vacation allocation complies with at least one business rule; and
automatically outputting, using the computer system, optimized manpower planning results in response to executing the optimization model, comprising:
in response to the execution of the optimization model, automatically outputting the optimized resource training schedule, the optimized resource new hire/recall schedule and the optimized resource vacation allocation.

8. The method of claim 7 further comprising:
determining a plurality of demands per each time segment over the first time horizon, each demand being a demand for a different fleet-seat combination;
wherein each surplus or deficit is dependent upon the demand per the corresponding time segment for the fleet-seat combination.

9. The method of claim 7 further comprising:
generating the airline flight schedule.

10. The method of claim 7 further comprising:
providing data parameters, the data parameters comprising:
a training movement matrix;
a training budget parameter;
a recalls/new hires maximum parameter;
a reserve utilization maximum parameter;
a starting head count parameter;
a minimum vacation percentage parameter;
a maximum vacation percentage parameter; and
a time horizon parameter corresponding to the second time horizon;
wherein executing the optimization model comprises:
providing an objective function;
providing a plurality of constraints, each of the constraints corresponding to one or more business rules, the plurality of constraints comprising:
a movement-percentage constraint;
a headcount restraint;
a vacation-maximum constraint;
a vacation-minimum constraint;
a recall constraint;
a reserve-utilization constraint; and
a training-capacity constraint;
providing variables; and solving the optimization model with one or more of the data parameters, the objective function, the constraints, and the variables.

11. The method of claim 7 wherein each resource in each fleet-seat combination is a pilot and the type of the resource is either a captain or a first officer;
wherein the method further comprises:
determining a plurality of demands per each time segment over the first time horizon, each demand being a demand for a different fleet-seat combination, wherein each surplus or deficit is dependent upon the demand per the corresponding time segment for the fleet-seat combination;
generating the airline flight schedule; and
providing data parameters, the data parameters comprising:
a training movement matrix;
a training budget parameter;
a recalls/new hires maximum parameter;
a reserve utilization maximum parameter;
a starting head count parameter;
a minimum vacation percentage parameter;
a maximum vacation percentage parameter; and
a time horizon parameter corresponding to the second time horizon;
wherein executing the optimization model comprise:
providing an objective function;
providing a plurality of constraints, each of the constraints corresponding to one or more business rules, the plurality of constraints comprising:
a movement-percentage constraint;
a headcount restraint;
a vacation-maximum constraint;
a vacation-minimum constraint;
a recall constraint;
a reserve-utilization constraint; and
a training-capacity constraint;
providing variables; and
solving the optimization model with one or more of the data parameters, the objective function, the constraints, and the variables.

* * * * *